United States Patent Office 3,039,981
Patented June 19, 1962

3,039,981
AQUEOUS BINDER COMPOSITION OF PHENOL-FORMALDEHYDE CONDENSATE, ALUMINUM SULFATE AND MINERAL OIL, AND GLASS FIBER COATED THEREWITH
Richard F. Shannon, Lancaster, and Willard L. Morgan and Philip W. Sullivan, Newark, Ohio, assignors to Owens-Corning Fiberglas Corporation, a corporation of Delaware
No Drawing. Filed Dec. 27, 1955, Ser. No. 555,224
4 Claims. (Cl. 260—29.3)

This invention relates to a resinous composition, and, more particularly, to such a composition that has been improved in certain respects by virtue of the replacement in its molecular structure of certain labile hydrogens with certain metals, and is especially suited for use as a coating or thermosetting plastic resin and may be used as an application to glass and other refractory fibers.

The present invention is based upon the discovery that certain synthetic resinous materials can be improved by reaction with any of several particular salts. Such improvement is readily measurable when the resinous material is applied to glass or refractory fibers as a binder or finish, but it will be appreciated that the improvement is in an inherent characteristic of the resin itself, and exists for whatever purpose the resin may be used. In general improvements in resistance to oxidation and stability of the resin strength are secured.

It is, therefore, an object of the invention to provide an improved synthetic resinous material.

It is a further object of the invention to provide methods for producing an improved synthetic resinous material.

It is still another object to provide refractory fibers such as glass fibers with such an improved synthetic resinous material applied thereto as a binder, finish or size.

It is a particular object of the invention to provide new phenolic resins and methods of making such which are relatively stable to oxidation, attack by alkali, or by water and which are of improved temperature resistance and color. The resins are either of water soluble type or may be of cured thermoset type and are of either aqueous dispersion, dry powder, or hard plastic form.

Other objects and advantages of the invention will be apparent from the description which follows, which is intended only to illustrate and disclose, and in no way to be a limitation thereon.

According to the invention an improved synthetic resinous material is provided. Such material comprises a synthetic resinous material having a molecular structure which includes the group

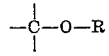

where R is a metal which has been substituted for hydrogen, for example is a hydroxyl or phenolic hydroxyl residue found on the basic resin.

The invention also contemplates methods for producing such a resinous material containing

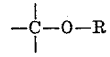

groups, where R is a metal. One such method includes the steps of effecting an aqueous dispersion comprising a resinous material having a molecular structure which includes labile hydrogens present in hydroxyl groups and a salt of a metal whose hydroxide, silicate and carbonate all have a pH not greater than 10.5, and forming the desired metallized resin in the dispersion. Another such method includes the steps of contacting an ion exchange material regenerated with a salt of such a metal with an aqueous dispersion comprising a resinous material having a molecular structure which includes labile hydrogens present in hydroxyl groups, and then reacting the metal ions off the cation exchange resin and into combination with the aqueous dispersed resin to form the desired

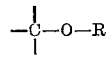

groups where R is the metal.

The invention is concerned with the modification of a partially formed or water soluble stage resin by reacting a metal at a hydroxyl or phenolic hydroxyl in such partially polymerized resins to form a resin wherein the phenolic hydroxyls are substituted with such metal. Such resins may be used directly for coating purposes or they may be dehydrated and used either for casting, or as a powder, for plastic molding to solid articles. The metal containing resins can thus further be cured by heat to water insoluble cured stage resins. In many cases the products are of light color or of lighter color than the untreated resins.

Oxidation of phenolic resins is rapid when sodium, for example, is present and the resin is in a too alkaline state. This readily happens when phenol formaldehyde resins are used as binders on glass fibers, since such alkali extracts to the surface of the fibers under humid conditions, and the resin in contact with the alkali oxidizes and fails rapidly as a bond. One special use of the invention is thus to provide oxidation resistant resins for use as binders for fibrous glass articles.

The term "dispersion" is used herein, and in the appended claims, in its usual generic sense to include all relatively stable systems, whether true solutions, suspensions, or sols including a dispersing medium and a dispersed substance. In general, however, we prefer to use resins in a water soluble stage.

The term "labile," as applied herein and in the appended claims to hydrogens is used in its usual sense to refer to reactive hydrogens. We find phenolic hydroxyls to be particularly reactive and favorable in producing our desired reacted resins.

The following specific example of the production of a synthetic resinous material according to the invention, and the use thereof as a binder coating on glass fibers, will provide a clear understanding of one aspect of the invention.

The terms "percent" and "parts," as used herein, and in the appended claims, refer to percent and parts by weight, unless otherwise indicated.

*Example 1*

An improved phenolic resin useful for bonding fibrous glass products was produced by effecting an aqueous dispersion comprising a phenolic resin and aluminum sulphate according to the following procedure:

A mixing tank provided with a propeller-type agitator was charged with 25 gallons of water, and rotation of the agitator was started, and continued throughout the following additions of materials. A 44.6 gallon portion of a water dispersible phenol formaldehyde resin containing 60 percent of solids, and commercially available under the trade designation "Tybon 5008FP" was then added to the mixing tank, followed by a 2.65 pound charge of aluminum sulphate (Al$_2$(SO$_4$)$_3$.18H$_2$O) dissolved in one gallon of warm water. A three gallon charge of 26° Baumé ammonia mixed with 3 gallons of water was then added slowly to the mixing tank. At this point the dispersion was checked to make sure that its pH was made up to 8. No aluminum hydroxide was precipitated as the aluminum was combined with the resin as a new compound.

A 7.6 gallon portion of a hydrocarbon mineral oil emulsified with ammonium stearate was then added to the mixing tank, followed by 116 gallons of tap water. The hydrocarbon mineral oil emulsion used was of a flash point of 450° F. and was similar in viscosity to number 300 engine oil. The emulsion is commercially available under the trade designation "K2B oil emulsion." The resulting dispersion was found to be a relatively stable emulsion.

The emulsion produced as described in the preceding paragraph was sprayed onto glass fibers immediately after formation thereof by stream blasts directed against molten streams of glass. The application of phenol formaldehyde binders to glass fibers used in the production of wool in this manner, as well as subsequently described steps, is well known, and is conventional in the art. The glass fibers coated with the emulsion were then collected on a foraminous conveyor and passed through a curing oven maintained at about 400–500° F. where water in the dispersion was vaporized, and the modified aluminum containing phenol formaldehyde binder cured. The residence time of the various density wools in the curing oven was approximately ½ to 5 minutes and the resin was then a thermoset, infusible, and water insoluble hard plastic body.

Rolls of the wool produced as described in the preceding paragraphs were compression packaged along with rolls of wool produced from a similar binder except that the latter contained no aluminum sulfate and therefore was not metallized. Both groups of building insulation rolls were placed in storage for periods of up to four weeks prior to being unrolled, allowed to stand on a flat surface for one hour, and measured for thickness recovery.

Several rolls of building insulation bonded with a water soluble phenol formaldehyde resin with and without aluminum sulfate were unrolled on the same day as manufactured and measured for thickness recovery. Using the thickness recovery of those rolls as one hundred percent, we may compare the loss in thickness recovery of rolls of building insulation stored for various periods of time. Those bonded with the metallized resin show less loss in thickness recovery than rolls of building insulation stored for the same period and bonded only with the water soluble phenol formaldehyde resin.

Rolls of building insulation containing the metallized resin and stored under compression show only 4.5 percent loss in thickness recovery at the end of the first week and a loss of only 8 percent at the end of the four week period whereas rolls of building insulation bonded with a standard water soluble phenol formaldehyde resin that has not been metallized loses 13 percent during the first week of storage and almost 20 percent after four weeks of storage under compression.

The product durability of those rolls of building insulation bonded with the metallized resin was considerably higher than the product durability of similar rolls of building insulation bonded with a phenolic resin that had not been metallized. Improvements in product durability of as much as 20 percent can be realized from the use of a metallized resin as the binder. This has been proven experimentally by placing samples of glass fibers bonded with a phenol formaldehyde resin and a similar resin that has been metallized in an autoclave at 4 to 7 p.s.i. for periods of up to 72 hours. Strength retention by those samples bonded with the metallized resin are as much as 20 percent higher than the strength retentions of those samples bonded with the straight phenol formaldehyde resin.

The improvement in resiliency of the glass wool produced as described in Example 1 clearly demonstrates that the phenol formaldehyde binder itself has been improved when the resin has been combined with aluminum sulfate. It is known that fibrous glass products deteriorate upon aging. We have found that such deterioration involves not only a breakdown of the glass but also a weakening of resin and possibly of the bond between a glass surface and a resinous binder, where for example, the binder used is a hardened phenol formaldehyde resin. It has been discovered that such deterioration is associated with the leaching of alkaline constituents such as sodium oxide from the glass. The alkali is dissolved in minute quantities of water and accumulates on the glass surface, and attacks both the resin and the glass. It has been suggested that alkali attack on glass can be prevented or minimized by spraying an acid on a surface of the glass, by applying acid reacting gases to the glass surface, or by applying acid reacting salts thereto. However, deterioration of fibrous glass only, as a result of such alkali leaching, is a slow process under ambient conditions, requiring several weeks or months, or even years in the case of low alkali glass, for a noticeable deterioration. Therefore, the improvement found in the early useful life period in resiliency of wool resulting from the application thereto of a binder that is a dispersion comprising the resin and aluminum sulphate demonstrates that reaction occurred in the dispersion between the resin and aluminum sulphate.

The following theoretical explanation of the chemical reaction between the phenol formaldehyde resin and aluminum sulphate is presented solely for the purpose of further disclosing the invention, and is in no way to be construed as a limitation thereon. Although the precise structure for phenol formaldehyde reaction products is not known, and, in fact, probably varies within limits even between two different samples from a single batch thereof cured under different conditions, it is generally agreed that the carbon atoms ortho and para to the hydroxyls in phenol are involved in the condensation, and that the hydoxyls are present in the condensation products at all stages.

It is known that the hydrogen of the hydroxyl group in simple phenols is labile, and can readily be replaced, for example, by sodium. In fact, sodium phenylate is used as an intermediate in many organic formulations. It is believed, therefore, that the improved phenol formaldehyde resin produced as described in Example 1 can reasonably be described as an aluminum phenylate formaldehyde condensation product particularly as aluminum ions cannot be precipitated when ammonia is added. The suggested relationship between the two forms of the resin, before and after effecting an aqueous dispersion comprising the resin and aluminum sulphate, will be apparent from the two formulas presented below, each of which represents an ortho reacted phenol formaldehyde condensation product of indeterminate length:

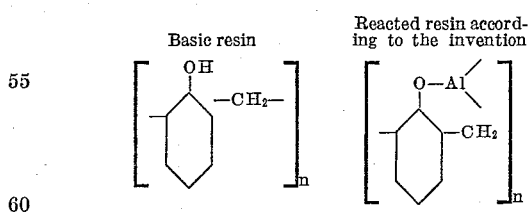

It will be understood, therefore, that a phenol formaldehyde condensation product according to the invention is improved by the presence therein, as a part of its molecular structure, of the group

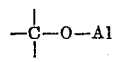

or a similar phenol group reacted with a metal. It has not been determined how the aluminum valences represented as free in the preceding formulae are satisfied in the improved resin produced as described in Example 1. It is possible that they are bonded to a sulphate group, or to oxygens from different phenol molecules, as suggested in the following formulas:

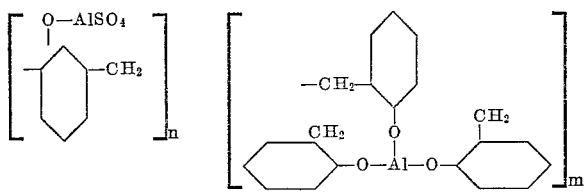

The last formula might be looked upon as a chelate type structure and the failure of the compounds to precipitate aluminum hydroxide with ammonia as well as the difficulties in ashing these materials upon heating suggests that chelate molecular structures are involved. In any event, the group

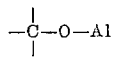

is involved.

Some authorities suggest that phenol formaldehyde condensation products have methylene alcohol groups (—CH₂OH) on terminal molecules in chains. Thus, the terminous of an ortho condensed phenol formaldehyde chain would have the following structure:

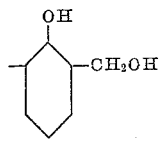

It will be apparent that the labile hydrogen of the hydroxyl of the methylene alcohol group is also capable of reaction with aluminum sulphate, and that such reaction would produce one of the following structures:

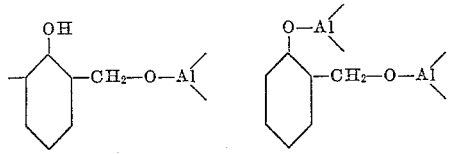

either of which contains the above typical formula

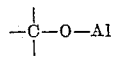

resulting from metal entering into a hydroxyl group of either aliphatic or phenolic types.

The improved durability of the glass wool produced as described in Example 1, and as measured by the described autoclave test, is believed to be attributable to the neutralization of alkali leached from the glass during aging thereof, with consequent prevention of attack thereby on the glass and also on the resin and the bond between these.

It has been determined experimentally that other metal salts than aluminum sulphate can be used, generally as described above, to produce an improved resin according to the invention, and these when applied to glass as a binder or finish, improve the durability and other physical properties of the resulting glass product. We prefer to use any salt of a metal whose hydroxide, silicate and carbonate all have a pH not greater than 10.5. Experimental work indicates that salts of aluminum, iron, titanium, magnesium and zirconium are most effective of all such salts, both at improving the resin per se, and at improving the durability of a glass or other refractory fiber coated therewith. Thus, in addition to the metals just listed others which meet the above pH qualification and which are suitable for use on glass fibers are resins containing silver, nickel, magnesium, lead, zinc, tin, manganese and chromium.

Certain metal salts provide colored resins when they are reacted in the manner of the invention. Thus a phenol formaldehyde resin of the A stage or water soluble form which was colorless gave a deep purple blue color with ferric salts, and ammonia would not precipitate iron hydroxide from such resin, although the color changed somewhat. A light yellow color develops when cupric salts are mixed into the resin, and when ammonia is added a green color develops, but no trace of the expected deep blue cuprammonium complex is found. On diluting these two solutions, light buff iron containing, and light yellow green copper containing resins are precipitated. In a similar way, after magnesium or aluminum is combined with the resins, the metallic hydroxides cannot be precipitated from the resins. Thus these reactions prove the reactions above set forth in the discussion of the formulae.

So far as is known at present, it is necessary to form an aqueous dispersion comprising the resin and the metal salt in order to produce an improved resin according to the invention.

It will be apparent from the foregoing discussion that resins other than phenol formaldehyde condensation products, so long as they contain labile hydrogens present in hydroxyl groups, can also be improved according to the invention by effecting an aqueous dispersion of the resin and of a salt of a metal. Examples of such other resins include the water soluble condensation products of substituted phenols with aldehydes, and of phenol with aldehydes other than formaldehyde, as well as urea formaldehyde condensation products, melamine formaldehyde condensation products, various alkyd resins, whether of the glycol or glycerol-saturated acid type, or of the unsaturated type usually produced from glycols, and polyvinyl alcohols, and other such resins containing labile hydrogens present in hydroxyl groups.

A consideration of the molecular structure of urea formaldehyde condensation products and melamine formaldehyde condensation products will make it clear that a related, but somewhat different type of reaction is possible between aluminum sulphate, for example, and such resinous materials. As will be apparent from the following formula, dimethylol urea contains two types of labile hydrogens:

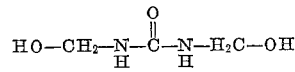

Reaction is possible between aluminum sulphate, for example, and the two labile hydrogens of dimethylol urea which are attached to the nitrogens, as well as with the two labile hydrogens of the methylene alcohol group. Such reaction would produce a modified condensation product which can be represented by the following formula:

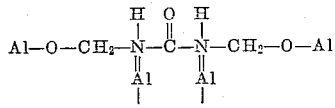

The low water resistance of urea- and melamine-formaldehyde condensation products is believed to be attributable to the presence therein of the labile hydrogens attached to nitrogens. It is believed, therefore, that the water resistance of such resinous materials is improved according to the method of the invention. In any event, the terminal methylene alcohol groups of either urea- or melamine-formaldehyde resins are capable of reaction with metal salts, as previously discussed.

The following examples showing additional instances of the improvement of synthetic resinous materials by effecting an aqueous dispersion comprising the resin and a salt of a metal whose hydroxide, carbonate and silicate all have a pH less than 10.5 are presented solely for the purpose of further illustrating and disclosing the invention, and are in no way to be construed as limitations thereon.

*Example 2*

The dispersion outlined in Example 1 was sprayed onto glass fibers immediately after formation thereof by steam blasts directed against molten streams of glass. The glass fibers coated with the emulsion were then collected on a foraminous conveyor, compressed to a density of 7 to 8 pounds per cubic foot and passed through a curing oven maintained at about 400–500° F. where water in the dispersion was vaporized and the modified aluminum containing phenol formaldehyde binder cured to a thermoset, infusible, and water insoluble hard plastic body.

The flexural and compressive strengths of the boards formed as outlined above, as well as of similar boards prepared from a phenol formaldehyde resin binder that did not contain metallized resin, were measured. Although no immediate improvement in flexural strengths could be noted from the use of a metallized resin, those samples bonded with the metallized resin had approximately 32.5 percent higher compressive strengths than those bonded with the standard phenol formaldehyde resin.

Both groups of boards, those bonded with the metallized resin and those bonded with the standard phenol formaldehyde resin, were stored for a period of five months. The flexural and compressive strengths were again measured and compared with the original strengths. Those samples bonded with a binder containing the metallized resin showed a 12.5 percent gain in flexural strengths and only a 9 percent loss in compressive strengths whereas those samples bonded with a standard phenol formaldehyde resin showed a loss of 10 percent in flexural strengths and a 9 percent loss in compressive strengths. Although both samples had the same percentage loss in compressive strengths after five months of storage, the samples bonded with the metallized resin were still 47 percent stronger than the samples bonded with the standard phenol formaldehyde resin.

The product durability of the high density wool boards was improved considerably by the use of a metallized phenolic resin in the binder formulation. As obtained from experimental data, an initial improvement of as much as 20 percent in product durability could be obtained by the use of the metallized resin. This improvement was actually increased after the five month storage period. The sample bonded with the standard phenol formaldehyde resin decreased in product durability with age whereas the sample bonded with the metallized resin actually improved. The difference in product durability was increased to over 40 percent after a storage period of five months.

The durability of various samples of material, as described in this and subsequent examples, is determined by the following procedure:

A sample to be tested is placed in an autoclave, and there subjected to steam at a pressure of 4 to 7 p.s.i. for 72 hours. A cylindrical test piece about ¾ inch in diameter and 1 inch thick is then cut therefrom, compressed with a force of about 10 pounds, projected against a hard surface, examined visually, and evaluated by a skilled technician for percentage of deterioration.

The compressive strength of various samples of material, as described in this and subsequent examples, is determined by the following procedure:

A test piece one foot square is cut from the sample to be tested, placed between two platens, and the force in pounds required to compress it to 90 percent of its original thickness determined. This force is considered to be the compressive strength of the sample.

*Example 3*

Another improved phenolic resin useful for bonding fibrous glass products was produced by effecting an aqueous dispersion comprising a phenolic resin, ammonia, and titanium sulphate according to the following procedure:

A mixing tank provided with a propeller type agitator was charged with 2.5 gallons of water, and rotation of the agitator was started, and continued throughout the following additions of materials. A 13.9 gallon portion of a water dispersible phenol formaldehyde resin containing 60 percent of solids, and commercially available under the trade designation "Tybon 5008 FP" was then added to the mixing tank, followed by a 4.25 pound charge of titanium sulphate ($TiOSO_4$). A 1.8 gallon charge of 26° Baumé ammonia mixed with 1.8 gallons of water was then added slowly to the mixing tank followed by 80 gallons of tap water.

Packs of unbonded fibrous glass wool were dipped into the above described formulation; the excess binder was removed by suction; and the resulting wool was compressed and cured in an air circulating oven at 400° F. for approximately 5 minutes to a density of 9 pounds per cubic foot.

The fibrous glass wool boards bonded with the metallized resin and produced as described above, along with fibrous glass wool boards of the same density, but bonded with a similar formulation except that the resin was not metallized, were measured for compressive strengths. The fibrous glass wool board bonded with the metallized resin had a compressive strength of 1128 pounds, whereas the fibrous glass wool boards bonded with the similar resin except that the resin was not metallized had a compressive strength of only 740 pounds. Thus, by the use of a metallized resin where the metal is titanium it is possible to raise the immediate compressive strengths at least 52 percent.

*Example 4*

Fibrous glass rods containing 3150 fibers averaging 0.00042″ in diameter and bonded with various metallized resins were prepared experimentally according to the following procedure:

A mixing tank provided with a propeller-type agitator was charged with 10 gallons of water, and rotation of the agitator was started, and continued throughout the following additions of materials. An 8 pound portion of a dry melamine-formaldehyde resin, commercially available under the trade designation "Melmac 405-S," was then added slowly to the mixing tank. As soon as all of the melamine-formaldehyde resin was dissolved, it was followed by an 0.11 pound portion of aluminum sulphate $(Al_2(SO_4)_3 \cdot 18H_2O)$ dissolved in one gallon of water. The resulting solution was found to be relatively stable.

The solution produced was applied from a pad application to continuous fibers as they were formed. After a total of 3150 fibers were collected into a bundle, the entire bundle of fibers was redipped in the solution prepared as described above. The excess binder was allowed to drain off. After the bundle of bonded fibers had dried for one hour, it was placed in an oven and cured at 400° F. for 10 minutes.

The bond strengths of the above described rods as well as of similar rods prepared from the same resin not metallized were measured. The fibrous glass rods bonded with the metallized melamine-formaldehyde resin had dry bond strengths of 500 grams whereas the fibrous glass rods bonded with a melamine-formaldehyde resin not metallized had dry bond strengths of only 205 grams.

Bond strength, as reported in this and subsequent examples, is determined according to the following procedure:

A bundle of fibers, bonded together by a binder, is supported at two points, one inch apart, and a force is applied to the bundle at a point midway between the two support points, or one-half inch from each. The applied force is increased at the rate of about 320 grams per minute until the bundle breaks. The force, at the time of breaking, is considered to be the bond strength.

We have found that our improved synthetic resinous materials characterized by the presence, in their molecular structure, of the group

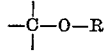

where R is a metal, can be produced by ion exchange, as well as by effecting a dispersion comprising the resin and an appropriate metal salt. When such an improved resin is produced by ion exchange, the exchange material should be regenerated with a salt of the metal which is to be introduced into the resin at the hydroxyl or phenolic groups. In general, the same considerations govern the selection of a salt for regeneration of an ion exchanger used to produce a composition according to the invention by ion exchange that govern the selection of a salt used to produce such composition by effecting a dispersion of the resin and of the salt.

In general, any cation exchange material can be employed in the production of a composition according to the invention, so long as it is regenerated with an appropriate metal salt, as discussed. Naturally occurring ion exchangers such as the zeolites are operable, as are sulphonated coals. Best results, however, are obtained using the relatively more efficient synthetic cation exchange resins which have recently been developed, for example of the type suggested in U.S. Patent 2,366,007, which are sulphonated polymerizates of mixtures comprising a polyvinyl aryl compound and a monovinyl aryl compound. We have found "Amberlite 1R–120," a synthetic cation exchange resin of this type sold by Rohm and Haas, to be suitable.

An improved synthetic resinous composition according to the invention can be produced by ion exchange merely by contacting an aqueous dispersion of the resin with an ion exchange material which has been previously treated with a metal salt solution as described above. For example the resin dispersion may be flowed through a suitable tower packed with the regenerated resin. The appropriately regenerated exchanger can also be mixed with an aqueous dispersion of the resin.

*Example 5*

An improved synthetic resinous composition useful for bonding fibrous glass products can be effected by merely contacting an aqueous dispersion of the resin with a cation exchange material which has been previously treated with a metal salt solution according to the following procedure:

A one cubic foot charge of cation exchange resin, commercially available under the trade designation of "Amberlite 1R–120" was placed in a five foot Lucite column. Such resin is a sulfonated styrene divinyl benzene copolymer having an activity of about 5 milliequivalents per gram on a dry basis. The proportion of styrene to divinyl benzene is about 92 parts of the former to 8 parts of the latter. The exchange resin fines were removed by back flushing with water. The cation exchange resin when received was also in the sodium form. Therefore, it was converted or regenerated from the sodium form to the metallic form before being used by running 600 pounds of a 10 percent solution of aluminum sulphate $$Al_2(SO_4)_3 \cdot 18H_2O$$

downward through the exchange resin. Regeneration or conversion to the aluminum form was effected as illustrated by the following formula, where E represents the exchange resin.

$$E \cdot SO_3 \cdot Na + Al_2(SO_4)_3 \rightarrow E \cdot SO_3 \cdot Al + Na_2SO_4$$

As soon as all of the sodium ions in the exchange resin were replaced with aluminum ions, the excess aluminum sulphate solution was removed. The water dispersible phenol formaldehyde resin described in Example 1 was then run through the cation exchange resin contained in the column.

All of the alkali metals, alkaline earths, and other contaminants such as iron in the resin when received were removed and retained in the cation exchange resin in the column. The aluminum ions replaced those ions previously retained by the water dispersible phenol formaldehyde resin and formed a metallized resin, which can be described as an aluminum phenylate formaldehyde condensation product, according to the following formula, where X represents the phenol formaldehyde condensation product, and E the exchange resin:

$$X-C-O-R + E \cdot SO_3 \cdot Al \rightarrow X-C-O-Al + E \cdot SO_3 \cdot R$$

The aluminum phenylate formaldehyde condensation product formed as outlined above has been used to bond wool packs of unbonded glass fibers together. When compared with similar wool packs of glass fibers bonded with a water dispersible phenol formaldehyde resin not metallized, the former packs, that is, those bonded with the metallized resins, show a product durability improvement of 10 to 20 percent over the packs of wool bonded with resins not metallized after subjection in an autoclave to 4–7 pounds per square inch steam pressure for 72 hours, when tested by the durability test described previously.

Wool boards bonded with the metallized resin as prepared by the cation exchange process had a greater resistance toward punking than similar wool boards bonded only with the standard phenol formaldehyde resin. When a cubic foot of wool bonded with the metallized resin was placed on a hot plate and the temperature raised in increments of 50° F. at 1 hour intervals, the wool did not begin to punk, or to burn slowly, until a temperature in excess of 850° F., or, in some cases as high as 1000° F., was reached, whereas a cubic foot of wool bonded with the standard phenol formaldehyde resin tested under the same conditions began to punk at 600° F. or less.

The type of metal salt used to regenerate the cation exchange resin should not be restricted to aluminum salts only. Experimental work indicates that salts of aluminum, iron, magnesium, zirconium, and titanium are most effective of all such salts, both at improving the punking resistance of the resin per se and at improving the durability of a glass or other refractory fiber coated therewith. In addition to the metals just listed above, others which also meet the pH requirement of not greater than 10.5, as described, including silver, nickel, lead, magnesium, zinc, tin, manganese, and chromium can be used.

The optimum extent to which an improved resin according to the invention should include the group $$-\underset{|}{\overset{|}{C}}-O-R$$

in its molecular structure has not be determined and probably varies under different circumstances. For example, when an aqueous dispersion is effected comprising the previously described phenol-formaldehyde condensation product commercially available under the trade designation "Tybon 5008 FF" and aluminum sulphate, it is found that substantial improvement results from 0.25 percent to 15 percent or even 20 percent, on a dry solids content basis, of the aluminum sulphate, calculated as $Al_2(SO_4)_3$. The optimum improvement is achieved with from about 5 percent to about 10 percent thereof, on such basis. However, when the dispersion described in Example 1, including an emulsified oil, is employed, substantial improvement is achieved with from about 0.25 percent to about 1 percent of aluminum sulphate, and optimum improvement is achieved with about 0.7 percent thereof. This amounts to a reaction of about 1 percent of the extent theoretically possible if all the hydrogens present in the phenol originally reacted to produce the resin were labile. Thus, it will be seen that the presence of ingredients other than the resin may change the preferred proportions.

It has been determined experimentally that this particular resin is capable of reaction with a metal salt to a considerably greater extent. For example, it has been found that 4 grams of cupric chloride can be added to a dispersion of the phenol-formaldehyde resin containing 16 grams of the resin, and that the addition of ammonia to the dispersion does not cause the characteristic dark blue color of the cuprammonium complex. It is believed, therefore, that improved resins according to the invention can include the group

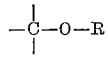

to an extent ranging from about 0.25 percent to about 25 percent of the labile hydrogens present in hydroxyl groups of the original resin, especially where the resin is phenolic.

It will be appreciated that the group

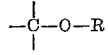

where R is a metal, can be present in synthetic resinous materials by virtue of reactions other than those which have been previously discussed. For example, a dispersion comprising phenol formaldehyde, a suitable salt, as described above, or the corresponding oxide or hydroxide, and a suitable base to bring the pH of the dispersion above 10, preferably to about 12, as is conventional in producing phenol formaldehyde condensation products can be effected. The condensation can then be carried to the "A" stage and the products neutralized and filtered to remove insoluble oxides, hydroxides, or other materials, or otherwise purified, in a known manner. The resulting resinous material would then preferably be contacted with a cation exchange resin regenerated with the salt used in the production of the resin.

The following examples of the production of improved resins according to the invention by reaction, in the presence of a salt, of resin forming ingredients are presented solely for the purpose of further disclosing the invention, and are in no way to be construed as limitations thereon.

*Example 6*

A mixture of 36 parts of 37 percent formalin, 6 parts of urea, 20 parts of diethylene glycol, and 40.7 parts of manganese acetate was effected in a glass reaction vessel, and heated at about 110° C. for one hour. The resulting reaction product was a clear, pink, viscous, water-soluble resin, and virtually free of manganese ions.

*Example 7*

A mixture of 37.6 parts of phenol, 98 parts of 37 percent formalin, 16 parts of cupric acetate, and 11.4 parts of sodium hydroxide was effected in a glass reaction vessel, and heated to about 120° C. for one hour. The resulting reaction product was a soft, sticky plastic mass, not soluble in water, but containing

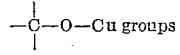

As is discussed and claimed in a copending application entitled "Improved Resinous Composition," filed February 10, 1956, Serial No. 564,760, some synthetic resinous materials can be improved by contacting an aqueous dispersion of the resin with an acid regenerated ion exchanger in order to remove such impurities as alkali metal cations which are normally present therein. Such treatment is particularly advantageous in the case of phenolic resinous compositions, which usually contain substantial amounts of alkali metal cations. The treatment is also advantageous as a preliminary step to the production of compositions according to the instant invention, by either of the two general methods discussed above.

It will be apparent that various changes and modifications can be made from the specific details disclosed herein without departing from the spirit of the attached claims.

What we claim is:

1. A binder composition comprising the reaction product of an aqueous dispersion of a phenol-formaldehyde partial condensation product, and from about 0.25 percent to about 1 percent, based upon total dry solids, of dissolved aluminum sulfate.

2. A binder composition comprising an emulsified hydrocarbon mineral oil and the reaction product of an aqueous dispersion of a phenol-formaldehyde partial condensation product, and from about 0.25 percent to about 1 percent of dissolved aluminum sulfate, based upon total dry solids.

3. A binder composition comprising an emulsified hydrocarbon mineral oil and the reaction product of an aqueous dispersion of a phenol-formaldehyde partial condensation product, and about 0.7 percent of dissolved aluminum sulfate, based upon total dry solids.

4. A glass fiber coated with a binder, in a cured condition, which binder is produced by heating an aqueous emulsion comprising an emulsified hydrocarbon mineral oil and the reaction product of an aqueous dispersion of a phenol-formaldehyde partial condensation product, and from about 0.25 percent to about 1 percent, based upon total dry solids, of dissolved aluminum sulfate.

References Cited in the file of this patent

UNITED STATES PATENTS

| | | |
|---|---|---|
| 2,207,442 | Ripper | July 9, 1940 |
| 2,236,061 | Izard et al. | Mar. 25, 1941 |
| 2,319,142 | Lebach | May 11, 1943 |
| 2,351,802 | Bergin et al. | June 20, 1944 |
| 2,543,801 | Patterson et al. | Mar. 6, 1951 |
| 2,544,667 | Goebel et al. | Mar. 13, 1951 |
| 2,544,668 | Goebel et al. | Mar. 13, 1951 |
| 2,552,910 | Steinman | May 15, 1951 |
| 2,582,919 | Biefeld | Jan. 15, 1952 |
| 2,612,481 | Cone | Sept. 30, 1952 |
| 2,631,920 | Albrecht | Mar. 17, 1953 |
| 2,642,360 | Mackinney et al. | June 16, 1953 |
| 2,683,130 | D'Alelio | July 6, 1954 |
| 2,690,393 | McGarvey | Sept. 28, 1954 |
| 2,710,289 | Smith-Johannsen | June 7, 1955 |
| 2,714,585 | Agens | Aug. 2, 1955 |
| 2,865,875 | Hyman et al. | Dec. 23, 1958 |